United States Patent
Seo et al.

(10) Patent No.: US 8,607,204 B2
(45) Date of Patent: Dec. 10, 2013

(54) METHOD OF ANALYZING SINGLE THREAD ACCESS OF VARIABLE IN MULTI-THREADED PROGRAM

(75) Inventors: Sun-Ae Seo, Seoul (KR); Sung-Do Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 13/171,271

(22) Filed: Jun. 28, 2011

(65) Prior Publication Data

US 2012/0096443 A1   Apr. 19, 2012

(30) Foreign Application Priority Data

Oct. 13, 2010   (KR) .......................... 10-2010-0099827

(51) Int. Cl.
*G06F 9/44* (2006.01)
*G06F 9/45* (2006.01)

(52) U.S. Cl.
USPC ........... 717/132; 717/119; 717/131; 717/133; 717/156; 717/157

(58) Field of Classification Search
None
See application file for complete search history.

(56) References Cited

U.S. PATENT DOCUMENTS

| | | | |
|---|---|---|---|
| 6,457,173 B1 * | 9/2002 | Gupta et al. .................. | 717/149 |
| 6,817,009 B2 * | 11/2004 | Flanagan et al. .............. | 717/126 |
| 6,920,634 B1 * | 7/2005 | Tudor ........................... | 718/107 |
| 8,316,355 B2 * | 11/2012 | Feng et al. .................... | 717/135 |
| 2002/0087953 A1 * | 7/2002 | Hines ............................ | 717/125 |
| 2005/0108695 A1 * | 5/2005 | Li et al. ......................... | 717/144 |
| 2008/0184211 A1 * | 7/2008 | Nickolls et al. ............... | 717/140 |
| 2008/0235674 A1 * | 9/2008 | Gao et al. ...................... | 717/141 |
| 2008/0301655 A1 * | 12/2008 | Gulwani et al. ............... | 717/156 |
| 2009/0199162 A1 * | 8/2009 | Choi et al. ..................... | 717/124 |
| 2009/0235262 A1 * | 9/2009 | Ceze et al. ..................... | 718/102 |
| 2009/0313612 A1 * | 12/2009 | Vick et al. ..................... | 717/136 |
| 2011/0078511 A1 * | 3/2011 | Sinha et al. ................... | 714/38.1 |
| 2011/0202907 A1 * | 8/2011 | Dice et al. ..................... | 717/148 |
| 2011/0246970 A1 * | 10/2011 | Ganai et al. ................... | 717/132 |
| 2012/0096441 A1 * | 4/2012 | Law et al. ..................... | 717/127 |
| 2012/0265931 A1 * | 10/2012 | Cheriton ....................... | 711/108 |
| 2013/0007536 A1 * | 1/2013 | Feng et al. ..................... | 714/45 |

OTHER PUBLICATIONS

"Static Data Race Detection for Concurrent Programs with Asynchronous Calls" by Vineet Kahlon, Nishant Sinha, Erik Kruus and Yun Zhang. The 7th joint meeting of the European Software Engineering Conference (ESEC) and the ACM SIGSOFT Symposium on the Foundations of Software Engineering (FSE) Aug. 24-28, 2009 Amsterdam, The Netherlands.*

(Continued)

*Primary Examiner* — Don Wong
*Assistant Examiner* — Hossain Morshed
(74) *Attorney, Agent, or Firm* — NSIP Law (57) ABSTRACT

A method of analyzing single thread access by a variable of a multi-threaded program is provided. The method includes computing a thread identifier of a thread to be executed in a node of the multi-thread program; computing multiple threads configured to concurrently execute the node; and computing thread accessibility by deducing one or more variables that are executed in a single thread of the program from one or more pairs of the computed threads that concurrently execute the node.

17 Claims, 10 Drawing Sheets

(56) References Cited

OTHER PUBLICATIONS

Author: Vineet Kahlon, Nishant Sinha, Erik Kruus, Yun Zhang Title: Static Data Race Detection for Concurrent Programs with Asynchronous Calls The 7th joint meeting of the European Software Engineering Conference (ESEC) and the ACM SIGSOFT Symposium on the Foundations of Software Engineering (FSE) Aug. 24-28, 2009 Amsterdam, The Netherlands.*

Vineet Kahlon, Nishant Sinha, Erik Kruus, Yun Zhang, "Static Data Race Detection for Concurrent Programs with Asynchronous Calls", The 7th joint meeting of the European Software Engineering Conference (ESEC) and the ACM SIGSOFT Symposium on the Foundations of Software Engineering (FSE) Aug. 24-28, 2009 Amsterdam, The Netherlands.*

* cited by examiner

```
500
   main ()
   {
1:   fork (child1, child_fn1);
2:   // first_do_something1 ()
3:   join (child1);

4:   fork (child2, child_fn2);
5:   // first_do_something2 ()
6:   join (child2);
   } child_fn1()
   {
7:   // child1_do_something1 ()
8:   // child1_do_something2 ()
   } child_fn2()
   {
9:   // child2_do_something1 ()
10:  fork (child3, child_fn3);
11:  // child2_do_something2()
12:  join (child3);
   }
```

| | 510 | 520 | 530 | 540 |
|---|---|---|---|---|
| | // C-M | // f/j(ch1) | // f/j(ch2) | // f/j(ch3) |
| | first -> - | first -> {(ch1, fn1)} | first -> {(ch1, fn1)} | first -> {(ch1, fn1)} |
| | first -> - | first -> {(ch1, fn1)} | first -> {(ch1, fn1)} | first -> {(ch1, fn1)} |
| | first -> - | first -> - | first -> - | first -> - |
| | first -> - | first -> - | first -> {(ch2, fn2)} | first -> {(ch2, fn2)} |
| | first -> - | first -> - | first -> {(ch2, fn2)} | first -> {(ch2, fn2)} |
| | first -> - | first -> - | first -> - | first -> - |
| | | ch1->{(first,1)} | ch1->{(first,1)} | ch1->{(first,1)} |
| | | ch1->{(first,1)} | ch1->{(first,1)} | ch1->{(first,1)} |
| | | | ch2->{(first,4)} | ch2->{(first,4)} |
| | | | ch2->{(first,4)} | ch2->{(first,4),(ch3, fn3)} |
| | | | ch2->{(first,4)} | ch2->{(first,4)} |
| | | | ch2->{(first,4)} | ch2->{(first,4),(ch3, fn3)} |

```
700
     1:  main ()
         {
     2:    fork (child1, child_fn1);
     3:    // first_do_something1 ()
            join (child1);
     4:    fork (child2, child_fn2);
     5:    // first_do_something2 ()
     6:    join (child2);
         }
         child_fn1()
         {
     7:    // child1_do_something1 ()
     8:    // child1_do_something2 ()
         }
         child_fn2()
         {
     9:    // child2_do_something1 ()
    10:    fork (child3, child_fn3);
    11:    // child2_do_something2()
    12:    join (child3);
         }
```

710  // C-M first -> {(c1,fn1)}
first -> {(c1,fn1)}
first -> - first -> {(c2,fn2)}
first -> {(c2,fn2)}
first -> - c1 -> {(first,1)}
c1 -> {(first,1)} c2 -> {(first,4)}
c2 -> {(first,4), (c3,fn3)}
c2 -> {(first,4), (c3,fn3)}
c2 -> {(first,4)}

720  // C-R (first,1:2) – (c1:7:8)    —721
(first,4:5) – (c2,9:12)   —722
(c2,10:11) – (c3,fn3)     —723
(first,4:5) – (c3,fn3)    —724

METHOD OF ANALYZING SINGLE THREAD ACCESS OF VARIABLE IN MULTI-THREADED PROGRAM

CROSS-REFERENCE TO RELATED APPLICATION

This application claims the benefit under 35 U.S.C. §119 (a) of Korean Patent Application No. 10-2010-0099827, filed on Oct. 13, 2010, in the Korean Intellectual Property Office, the entire disclosure of which is incorporated herein by reference for all purposes.

BACKGROUND

1. Field

The following description relates to data-race analysis for ensuring secure thread access in a multi-threaded program, for example, by analyzing the occurrence of thread access by a single thread through compile time analysis.

2. Description of the Related Art

Multi-core computing systems have contributed to development and wide use of the multi-threaded programs. Since the complexity of a multi-threaded program utilizing a thread, a lock, and shared data is increased exponentially (as compared, for instance, to a single-threaded program), it may be difficult to make an errorless program and/or to check errors of the program. Thus, as the use of the multi-threaded programs increases, attempts and researches on elimination of errors such as, for example, data-race and deadlock have been conducted.

Such thread error analysis primarily identifies accessed locks and data of each thread. Therefore, analysis of thread access is required to check an error or performance of a multi-threaded program. One method of analyzing secure thread access in a multi-threaded program includes data-race analysis. The data-race analysis is categorized into dynamic analysis and static analysis.

Static analysis reports a code in advance which is a potential error through analysis during compile time, but this analysis method is too complicated and is not appropriate as a bug validation tool due to false alarm.

In comparison, dynamic analysis rarely has a false alarm, and is simpler to analyze, compared to the static analysis, and thus it is easy to be implemented and used as a bug validation tool. However, the dynamic analysis has a serious drawback in that instrument analysis is required for almost all load/store operations in the program and accordingly heavy runtime overload occurs.

SUMMARY

According to an aspect, a method of analyzing single thread access by a variable of a is multi-threaded program in a computing system may include: computing a thread identifier of a thread to be executed in a node of the multi-thread program; computing multiple threads configured to concurrently execute the node; and computing thread accessibility by deducing one or more variables that are executed in a single thread of the program from one or more pairs of the computed threads that concurrently execute the node.

The computing of the thread identifier may include generating a control flow graph graphically by transforming a control flow to an edge, and an assignment or a condition that changes a state of the program to a node.

The computing of the one or more threads may include: generating a concur-map by mapping the thread identifiers of the threads, configured to concurrently execute the node of the program, to corresponding nodes, and generating concur-relation indicating concurrent execution of the node by the threads by extracting the one or more pairs of the threads configured to concurrently execute the same node based on the concur-map.

The generating of the concur-map may include: when the node is a fork operation to generate a new process, computing a parent thread identifier of a parent thread that executes the node and a child thread identifier that is written in the node; computing another node configured to be concurrently executed with the node by obtaining information about a function to be executed by the child thread while the parent thread is executing the node; and generating the concur-map by mapping the computed thread identifier to the computed node.

The generating of the concur-map may include: when the node is a join operation to end a running process, computing a child thread identifier that is written in the node; computing information that indicates that the node is not concurrently executed with a child thread of the child thread identifier using the computed child thread identifier; and generating the concur-map by mapping the computed thread identifier and the computed information.

The generating of the concur-map may include if the node is a node in which two edges are combined together, adding concur-maps generated from the respective edges.

The generating of the concur-map may include: when the node is not a fork operation to generate a new process, performing a join operation to end a running process; and when the node is not a node in which two edges are combined together, determining a concur-map which has been generated from a previous node as a concur-map for the node.

The generating of the concur-map may be repeatedly performed for all nodes of the program until a generated concur-map is not transformed.

The generating of the concur-relation may include: detecting a pair of the node and a thread identifier of a thread configured to perform concurrent execution using the generated concur-map; deducing a pair of a node and a thread identifier, which has transitivity, from the detected pair of the thread identifier and the node; and generating the concur-map by mapping the computed thread identifier and the node.

The computing of the thread accessibility may include: assigning an initial value to thread accessibility of a variable which performs thread access and is present in a node that is executed by a thread; and determining the thread accessibility of a variable as multiple thread access when the variable is present in the node executed by a specific thread and it is detected that the same variable is present in another node that is concurrently executed by the specific thread with reference to a pair of threads to concurrently execute the each node.

The computing of the thread accessibility may includes: determining the thread accessibility of a variable as single thread access when the variable is present in the node executed by a specific thread; and detecting that the same variable is not present in another node that is concurrently executed by the specific thread with reference to a pair of threads to concurrently execute the node.

The computing of the thread accessibility may further include: when the variable present in the node is a local variable and the variable is allowed to be outside a region currently executed, determining thread accessibility of the variable as multiple thread access; and when the variable is not allowed to be outside a region currently executed, determining thread accessibility of the variable as single thread access.

The computing of the thread accessibility may include: determining whether one or more variables on node access the same memory space and generating points-to information of the one or more variables that access the same memory space, and determining thread accessibility of the one or more variables on the node as multi thread access when it is determined, with reference to pairs of threads configured to concurrently execute the computed node and the points-to information, that another variable which is belonging to the same point-to group as the one or more variables is and performs thread access is present in another node configured to be executed concurrently with the node by a specific thread.

The computing of the thread accessibility may further include: determining thread accessibility of the one or more variables on the node as single thread access when it is determined, with reference to pairs of threads configured to concurrently execute the computed node and the points-to information, that another variable which is belonging to the same point-to group as the one or more variables is and performs thread access is not present in another node configured to be executed concurrently with the node by a specific thread.

The computing of the thread accessibility may further include: when the one or more variables present in the node are a local variable and the one or more variables are allowed to be outside a region currently executed, determining thread accessibility of the variable as multiple thread access; and when the one or more variables are not allowed to be outside a region currently executed, determining thread accessibility of the one or more variables and another one is or more variables configured to access the same memory space as the one or more variables as single thread access, and determining thread accessibility of the another one or more variables as single thread access when the another one or more variables are not allowed to be outside a region currently being executed.

According to another aspect, a computer-readable medium having instructions that when executed may be configured to implement a method of analyzing single thread access by a variable of a multi-threaded program in a computing system. The instructions may be configured to: compute a thread identifier of a thread to be executed in a node of the multi-thread program; compute multiple threads configured to concurrently execute the node; and compute thread accessibility by deducing one or more variables that are executed in a single thread of the program from one or more pairs of the computed threads configured to concurrently execute the node.

According to yet another aspect, a computing device having one or more processors may be configured to implement a method of analyzing single thread access by a variable of a multi-threaded program in a computing system. The one or more processors may be configured to: compute a thread identifier of a thread to be executed in a node of the multi-thread program; compute multiple threads configured to concurrently execute the node; and compute thread accessibility by deducing one or more variables that are executed in a single thread of the program from one or more pairs of the computed threads configured to concurrently execute the node.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems is described herein will be suggested to those of ordinary skill in the art. Also, descriptions of well-known functions and constructions may be omitted for increased clarity and conciseness.

Figure 1:
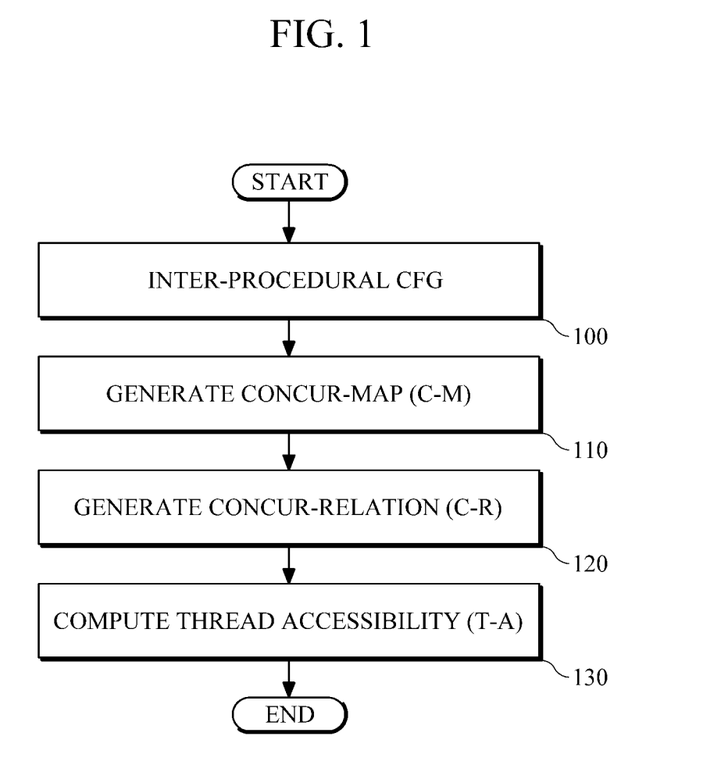
FIG. 1 is a flowchart illustrating a method of analyzing the occurrence of single thread access.

FIG. 1 illustrates a flowchart of a method of analyzing the occurrence of single thread access.

In operation 100, a control flow graph for a multi-threaded program may be generated or created to compute thread identifier (ID) of a thread to execute each node.

Then, in operation 110, threads that can concurrently execute each node of a program are computed. More specifically, a concur-map (C-M) may be created or generated by mapping the tread identifiers (IDs) of threads that can concurrently execute each node to the corresponding nodes is computed.

In operation 120, pairs of threads that can concurrently execute the same node are extracted based on the concur-map to generate concur-relation (C-R) that indicates concurrent execution of the same node by each thread.

Finally, in operation 130, a variable to be executed in only one thread is derived from the extracted pairs of the threads that can concurrently execute each node to obtain thread accessibility. Accordingly, a variable property of each node which accesses the thread of the multi-threaded program can be analyzed.

Figure 2:
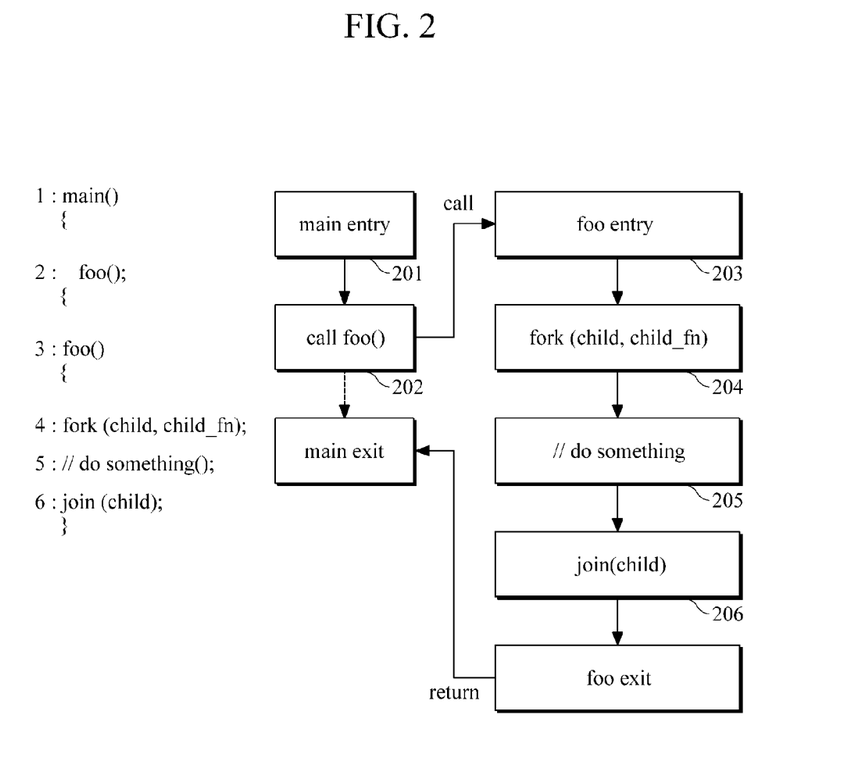
FIG. 2 is a diagram illustrating a control flow graph for a program.

FIG. 2 illustrates a control flow graph for a program. In FIG. 2, the left-handed side represents an example of a program code, and the right-handed side is a control flow graph (CFG) that represents the program code of the left-handed side.

The example illustrated in FIG. 2 is based on inter-procedural data-flow analysis. An inter-procedural data-flow analysis is a basic analysis method of static analysis that performs analysis by changing the program into the form of a CFG. In the CFG, one or more control flow operations (such as, for example, "if then else," "while," or "function call") are transformed is into edges, assignments and/or conditions of a program for changing a state of the program. For instance, the control flows may be transformed into nodes. Thus changes in program values can be easily tracked.

Referring to the example illustrated in FIG. 2, a first state of the program code is a preparation code for executing a main thread, which is denoted by reference 201. A second statement of the program code is a code for calling a function foo( ), which is denoted by reference 202.

A third statement is a code to be applied to the called function, foo( ), which is denoted by reference 203. In similar manner, a fourth statement is denoted by reference 204, a fifth statement is denoted by reference 205, and a sixth statement is denoted by reference 206.

As illustrated in FIG. 2, "fork" and "join" represent "pthread_create," and "pthread_join", respectively, and "fork" receives a function that is executed by a thread ID and a newly created thread as a parameter.

"join" receives a thread ID to be destroyed as a parameter.

The program code illustrated in FIG. 2 may be assumed to have the following characteristics:

First, a thread always joins a parent thread that has created the thread. That is, no detached thread is present, all threads do not exist longer than their parent threads, and the parent threads always control life cycles of their child threads explicitly using commands of fork(child)/join(child).

Second, fork/join of a given thread can be statically recognized by one thread ID. For example, if there is folk(tid), an existence range of a thread corresponding to the thread ID, tid, should be recognized from a code, join(tid), to join the thread based on the same thread ID, tid. The first two characteristics may not always be satisfied in all programs. However, even when is the above characteristics are not satisfied, analysis may possibly be performed, but its accuracy decreases. Generally, it may be assumed that such characteristics can be satisfied by a multi-threaded program.

In addition, a line number of a program code can be used in parallel with a node or a statement, and for convenience of explanation, hereinafter, a "line number" will be used for explaining an example of a program, a "node" will be used to refer to a statement on a CFG, and a "statement" will be used for the other examples.

Figure 3:
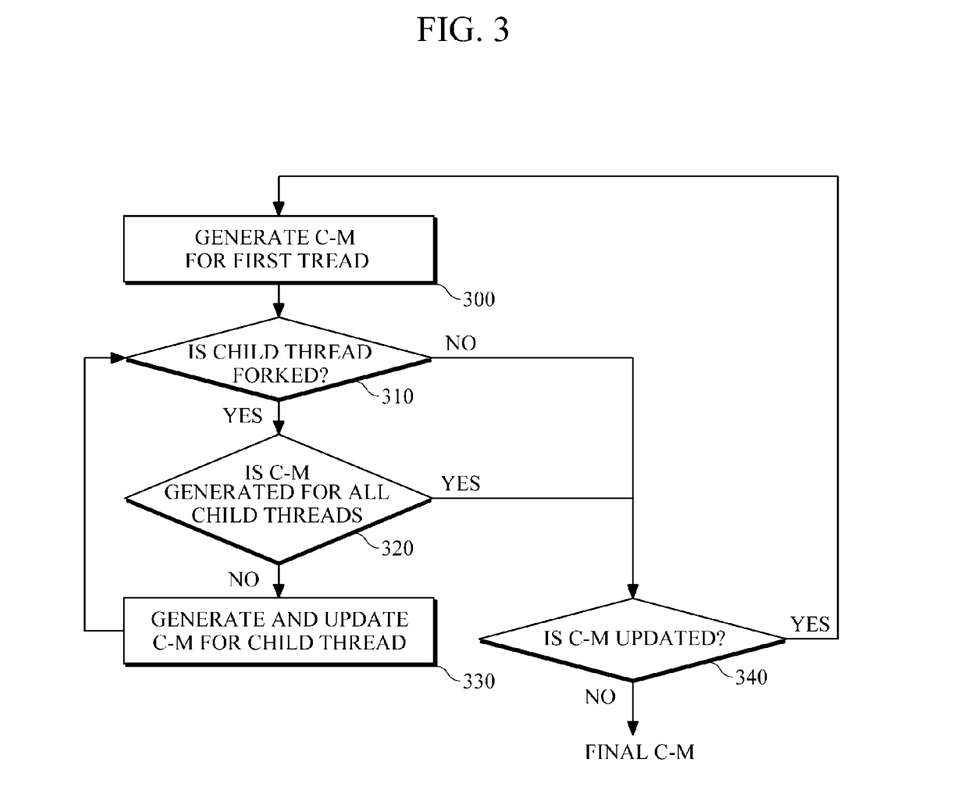
FIG. 3 is a flowchart illustrating a method of generating a concur-map (C-M) of the whole program.

FIG. 3 illustrates a flowchart of a method of generating a concur-map (C-M) of the whole program.

The concur-map, which is a core data structure, receives a thread ID and a location (line number, statement) of a code in the program, and outputs groups of pairs of the thread ID and the location (line number, statement) of the code.

For example, if 'd' denotes a concur-map, d(child, 3)= {(first, 3), (child, rec)} indicates that when a child thread executes a third statement, a first thread may execute the same third statement or the child thread may execute a function "rec( )" at the same time.

In FIG. 3, the concur-maps are generated as many as the number of thread IDs. The concur-maps may be applied to the threads individually, and in the example, the analysis may be performed first on a parent thread (hereinafter, referred to as a "first thread") and then on a child thread, which is not necessarily done in this order.

First, in operation 300, through inter-procedure Data Flow Analysis (DFA), concur-maps with respect to the respective statements of the first thread are computed.

Then, in operation 310, it is determined whether the child thread is forked (or not). If the child thread is forked, in operation 320, it is determined whether or not the concur-maps are is generated with respect to all child threads. Otherwise, if the child thread is not forked, processing proceeds to operation 340.

In operation, 330, only when it is determined in operation 320 that the concur-maps are not generated, the concur-maps are updated. And processing returns to operation 310, where it is determined whether another child thread is forked or not.

If the child thread is not forked (operation 310) or concur-maps are generated with respect to all child threads (operation 320), in operation 340, it is determined whether or not the currently generated concur-map is identical with a previously generated concur-map. And a concur-map finally updated is determined as a final concur-map or processing return to operation 300.

Figure 4:
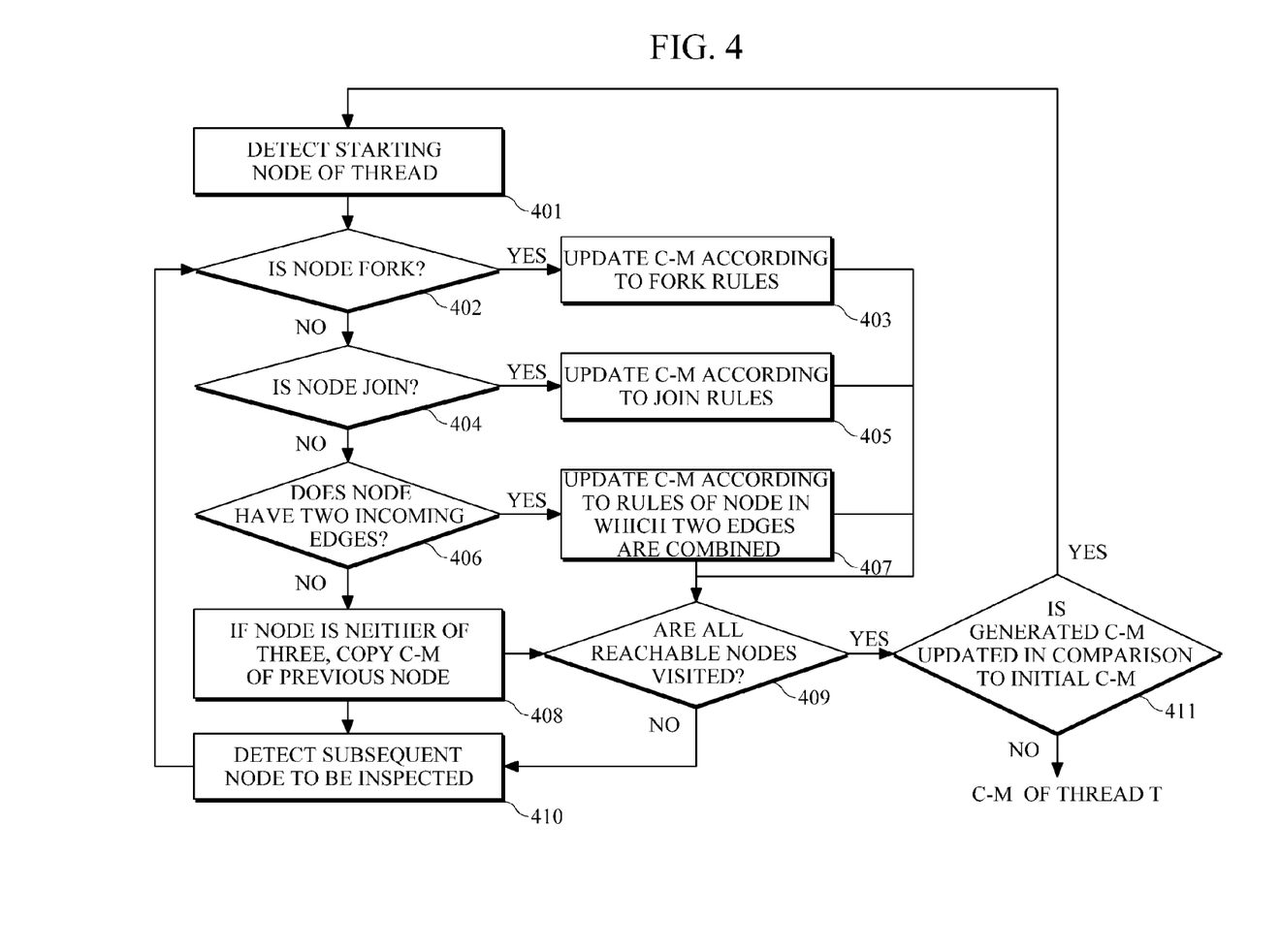
FIG. 4 is a flowchart illustrating a method of generating a C-M with respect to each thread.

FIG. 4 illustrates a flowchart a method of generating a concur-map with respect to a thread.

In FIG. 4, rules and operations for directly generating the concur-map for each thread are shown.

A control flow graph (CFG), a thread ID of a thread currently being executed, and/or a concur-map which has been built until present may be required to generate the concur-map. If a concur-map is generated for the first time, a concur-map that has been built until present may not be required.

First, search begins from a starting node of a thread currently being executed using the above information in operation 401. A concur-map of each node is generated in operations 403, 405, and 407 according to the type of a node which includes a fork node (operation 402), a join node (operation 404), or a node having two incoming edges (operation 406).

Rules of a concur-map may be generated according to the type of a node may be as follows.

If a node (or a statement) to be analyzed is a fork node, rules may be represented as below.

[[fork1($ch_1$, ch_fn1)]]t d=d[(t,l)→d(t,l−1) U {($ch_1$,ch_fn1)}, $ch_1$, ch_fn1$_{entry}$)→{(t,l)}]

Here, the subscripted "1" denotes a line number of a program code, "l−1" denotes a line number of a statement of a previous node on a CFG, "cn_fn1_entry" denotes a line number of the first node of a function ch_fn1( ), and "ch_fn1" denotes all line numbers in a code containing a function.

The above expression indicates that when a thread 't' executes fork1($ch_1$, ch_fn1), a new child thread 'thread ch1' is computed and accordingly a concurrent execution section is produced. That is, (t,l) is executed concurrently with ($ch_1$, ch_fn1) and inversely ($ch_1$, ch_fn1_entry) is executed concurrently with (t,l), and such information is displayed in accordance with the line numbers of program codes, so that the concur-map is generated.

If the node (or a statement) to be analyzed is a join node, it may be represented as follows:

[[join1($ch_1$)]]t d=d[(t,l)→d(t,l−1)\{($ch_1$, ch_fn1)}]

The above expression indicates that execution of a child thread 'thread ch1' is finished in response to a thread 't' executing join($ch_1$), and accordingly, the concur-map is updated by reflecting information notifying that "$ch_1$" and "t" are not executed concurrently with each other.

If the node (or a statement) to be analyzed is a node in which two edges are combined together in the CFG, it may be represented as below.

[[stmt1+stmt2]]t d=([[stmt1]]t d) U ([[stmt2]]t d)

Here, (d1 U d2)(t,l)=d1(t,l) U d2(t,l)

The above expression indicates that when two edges are combined into one edge, a is concur-map is updated by linearly merging concur-maps of both edges.

The other nodes besides the above-described nodes receive concur-maps intact which have been defined for their previous nodes on the CFG (operation 408).

Once the concur-map is updated according to the type of the node, it is determined whether all reachable nodes to be inspected are visited (operation 409), and if another reachable node to be inspected is present, the node is detected (operation 410), and according to the type of the detected node, the operations 402 through 408 are repeated. In response to the completion of generation of concur-maps of all nodes, a previously generated concur-map is compared to a currently generated concur-map, and only when two concur-maps are identical with each other, a final concur-map is acquired for the thread currently being executed (operation 411).

That is, the concur-map of all threads may be repeatedly generated until the concur-map does not change, and once the generation of concur-map of each thread is completed, a final concur-map is acquired.

Figure 5:
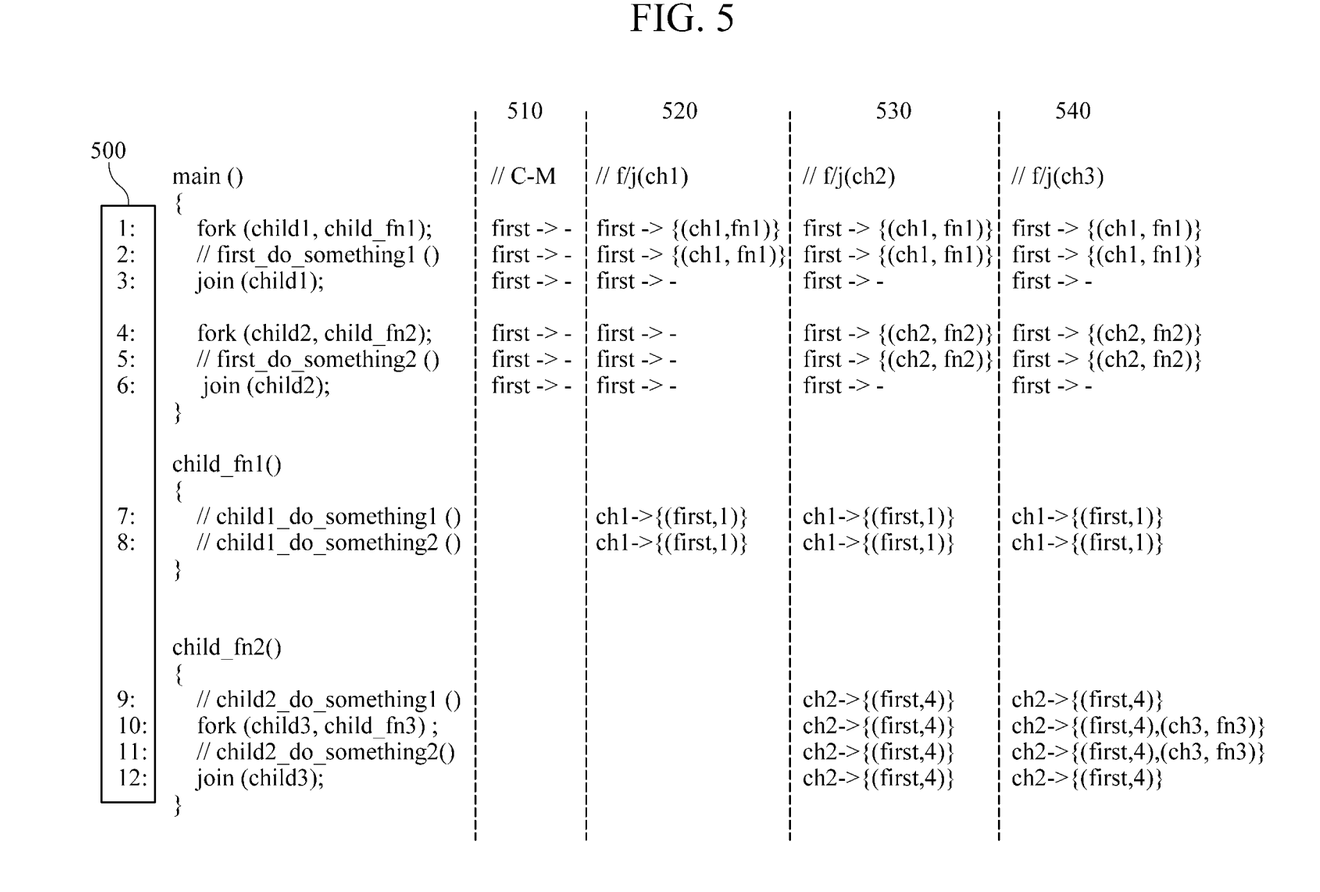
FIG. 5 is a diagram illustrating a C-M generated according to a program code.

FIG. 5 illustrates a concur-map (C-M) generated according to a program code.

In particular, FIG. 5 shows a result of a concur-map generated through the procedures shown in FIGS. 3 and 4, using a program code.

A program code having line numbers as denoted by reference 500 in the example in FIG. 5 is illustrated on the left-handed side. According to the procedures illustrated in FIG. 4, between line numbers 1 and 6 in which the first thread is executed, fork nodes are present on the line numbers 1 and 4, and join nodes are present on the line numbers 3 and 6, and accordingly, these nodes are represented in accordance with rules corresponding to the types of the nodes. Since nodes on the line numbers 2 and 5 are neither fork nodes, join nodes, nor incoming edge nodes, the node on the line number 2 copies the concur-map of the node on the line number 1, and the node on the line number 5 copies the concur-map of the node on the line number 4, is which may be represented as reference 510 in the example illustrated in FIG. 5.

Then, line numbers 1, 7, and 8 on which the second thread, that is, a child thread "child1" is executed display the concurrent execution of the first thread and the child thread ch1, and since the line number 2 is neither a fork node, a join node, nor an incoming edge node, the line number 2 copies a concur-map represented in the line number 1, which may be represented as reference 520 in the example illustrated in FIG. 5.

Subsequently, line numbers 4, and 9 through 12 on which the third thread, that is, a child thread "child2," is executed display the concurrent execution of the first thread and the child thread ch2, and since the line number 5 is neither a fork node, a join node, nor an incoming edge node, the line number 5 copies the concur-map of the line number 4 intact, which may be represented as reference 530 in the example illustrated in FIG. 5.

Finally, line number 10 on which the fourth thread, that is, a child thread, "child3," is executed displays the concurrent execution of the child thread ch3 and the first and the second threads, and since line number 11 is neither a fork node, a join node, nor an incoming edge node, the line number 11 copies the concur-map of the line number 10 intact, which may be represented as reference 540 in the example illustrated in FIG. 5.

Because there are no more threads or nodes present, there is no change in the concur-map even when operations shown in the examples illustrated in FIGS. 3 and 4 are repetitively performed, and a final concur-map of the program code shown in the example illustrated in FIG. 5 is generated as represented by reference 540.

Figure 6:
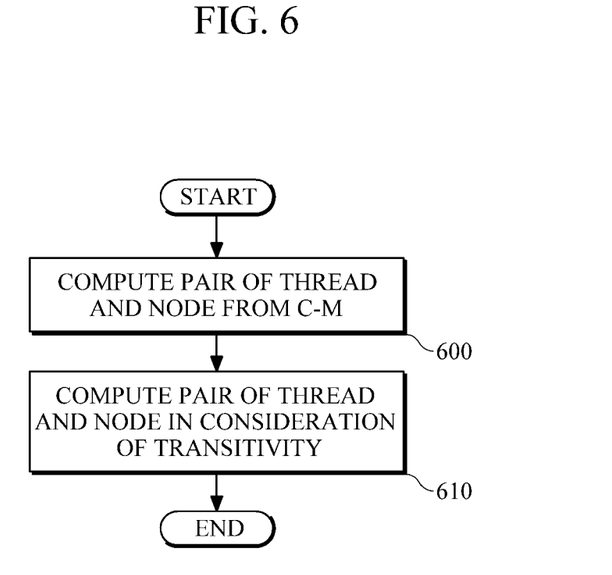
FIG. 6 is a flowchart illustrating a method of deducing a concur-relation (C-R) of a program.

FIG. 6 illustrates a flowchart of a method of deducing concur-relation of a program.

The concur-relation (C-R) may be deduced from the concur-map (C-M) generated through the procedures shown in FIGS. 3 and 4, and may be a core algorithm for analyzing a is multi-threaded program that defines concurrent execution between nodes.

The concur-relation may be deduced from the concur-map by two methods described below with reference to FIG. 6.

In operation 600, the concur-relation may be directly deduced or otherwise computed from the concur-map as follows.

(t1,loc1) C-R (t2,loc) if and only if (t2,loc2) is included in d(t1,loc1) or (t1,loc1) is included in d(t2,loc)

The above definition indicates that if there is either an event in which at the time of a thread 't1' executing a node 'loc1,' a thread 't2' concurrently executes a node 'loc2,' or an event in which at the time of the thread 't2' executing the node 'loc2,' the thread 't1' concurrently executes the node 'loc1,' it is represented as "(t1,loc1) C-R (t2,loc)" on the concur-relation (C-R).

In operation 610, a concur-relation (C-R) may be deduced or otherwise computed from the previously generated concur-relation in consideration of transitivity by means of a definition, as follows.

(t1,loc1) C-R (t3,loc3) if (t1,loc1) C-R (t2,loc2) and (t2, loc2) C-R (t3,loc3)

The above definition indicates that if there is an expression such as "(t1,loc1) C-R (t2,loc2)" and "(t2,loc2) C-R (t3, loc3)" on the concur-relation (C-R), the expression can be represented as "(t1,loc1) C-R (t3,loc3)." Such a relation may be referred to as transitivity.

Figure 7:
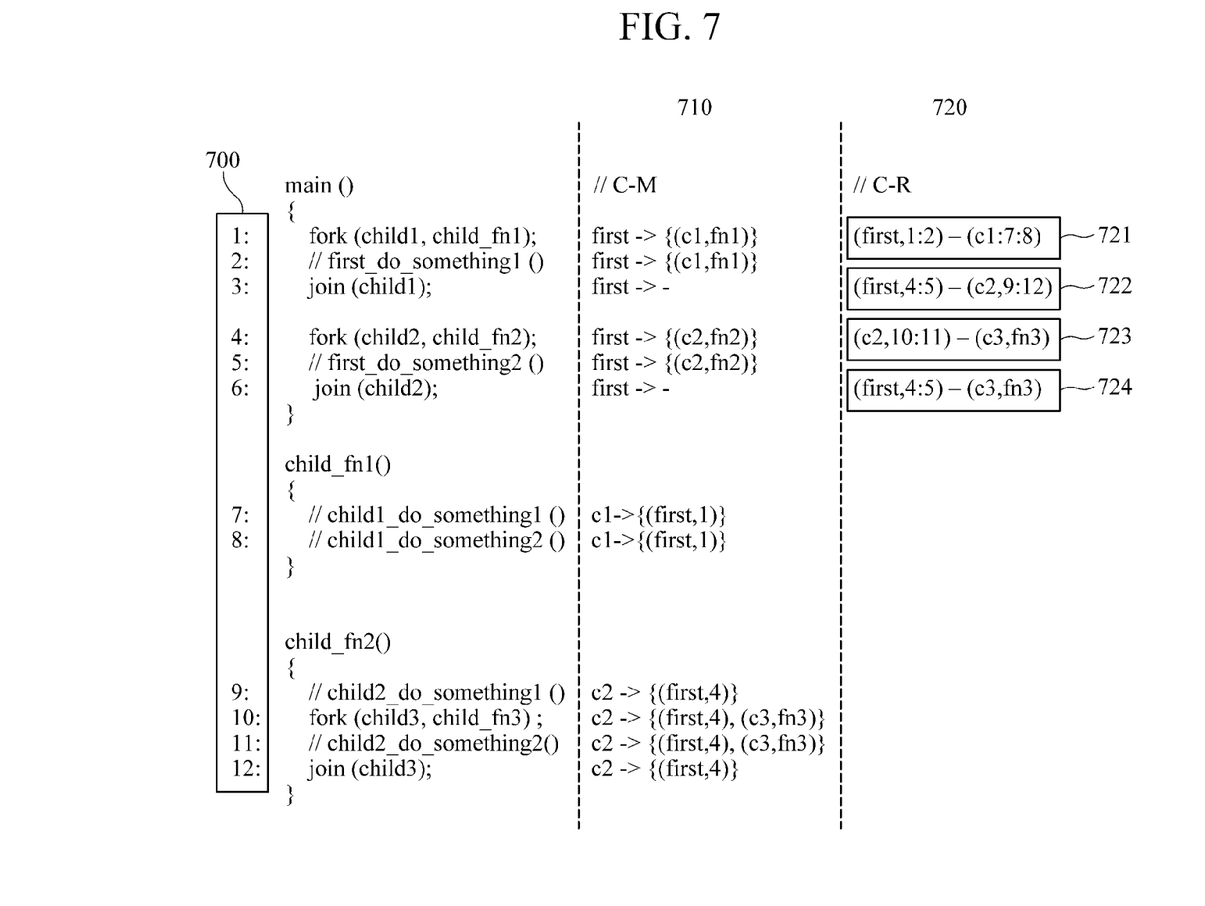
FIG. 7 is a diagram illustrating C-R generated according to a program code.

FIG. 7 illustrates a concur-relation (C-R) generated according to a program code.

In particular, FIG. 7 shows procedures of generating a concur-relation (C-R) via the procedures shown in FIG. 6 according to a program code.

A program code having line numbers is shown in the most left side, as denoted by reference 700. A concur-map (C-M) 710 may be generated according to the procedures as is illustrated in FIGS. 3 and 4, and the concur-relation (C-R) 720 which is the same as the final concur-map 540 in FIG. 5 can be deduced from the concur-map 710.

In the generation of each line in C-R 720, reference 721 indicates that at the time the first thread executes the first and second lines, a child thread 'c1' can concurrently execute the seventh and eighth lines, and denotes four pieces of information, (first,1)-(c1,7), (first,1)-(c1,8), (first,2)-(c1,7), (first,2)-(c1,8).

In addition, reference 722 indicates that at the time the first thread executes fourth and fifth lines, a child thread 'c2' can concurrently execute the ninth to twelfth lines. Reference 723 indicates that at the time the child thread 'c2' executes the tenth and eleventh lines, a child thread 'c3' can concurrently execute a function fn3. The concur-relations 721, 722, and 723 may be deduced from the concur-map intuitively.

From the concur-relations 722 and 723, 724 indicates that at the time the first thread executes the fourth and fifth lines, the child thread 'c3' can concurrently execute the function fn3 because it is indicated that at the time the first thread executes the fourth and fifth lines, the child thread 'c2' concurrently execute the ninth to twelfth thread, which means the child thread 'c2' executes the tenth and eleventh lines, and from the concur-relation 723, it is deduced that at the time the child node 'c2' executes the tenth and eleventh lines, the child node 'c3' can concurrently execute the function fn3.

Thus, it is understood that when the first thread executes the fourth and fifth lines, the child thread 'c3' can concurrently execute the function fn3 (740). Accordingly, the concur-relation (C-R) 724 may be enabled to be deduced by transitivity.

Hence, a final concur-relation (C-R) using the program code shown in the example illustrated in FIG. 7 is represented as C-R 720.

Figure 8:
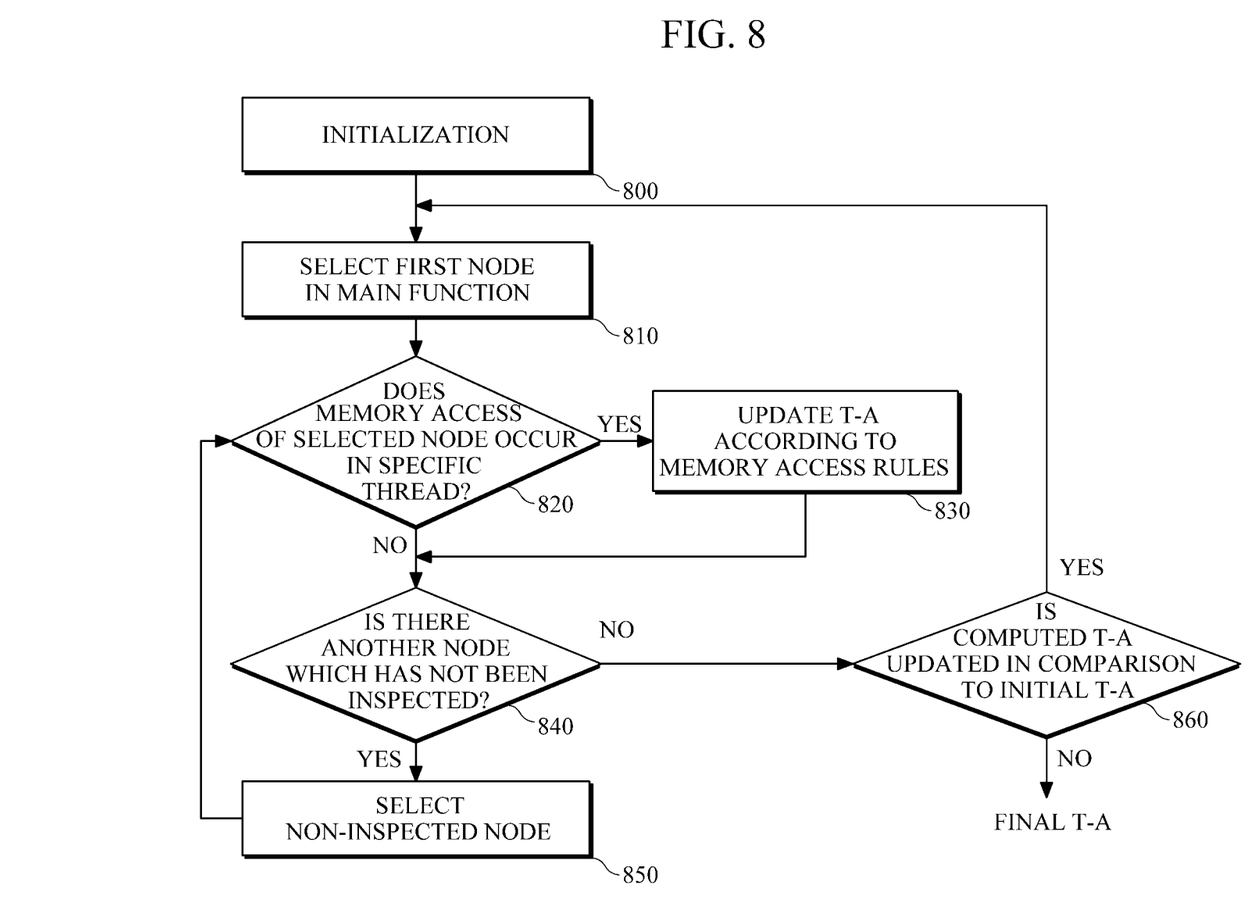
FIG. 8 is a flowchart illustrating analyzing thread accessibility (T-A) of a program.

FIG. 8 illustrates a flowchart of analyzing thread accessibility (T-A) of a program.

In analysis of thread accessibility, it is detected whether single thread access occurs or concurrent thread accesses occur with respect to variables executed by a thread of a program. Thus, to analyze the thread accessibility (T-A), both a concur-map (C-M) which provides information regarding in which thread each node can be executed and a concur-relation (C-R) which provides information regarding whether two nodes can be concurrently executed are used.

To this end, the thread accessibility (T-A) may be defined to be analyzed as follows.

The thread accessibility (T-A) may be represented as (t,l,v) in a case in which a thread 't' perform thread access using a variable 'v' on a line number 'l,' and one of three values {0, tSingle, tMulti} may be mapped to the thread accessibility (T-A). The meaning of each of the values indicates as follows:
(t,l,v)→0: initial state
(t,l,v)→tSingle: a variable 'v' is used in a single thread
(t,l,v)→tMulti: a variable 'v' is used concurrently in multiple threads As initial values of the thread accessibility, for all thread access performed in a specific thread, (t,l,v) is set to 0 (operation 800). In this case, a node which is not executed in the specific thread or does not perform thread access in the program is not included in analysis of the thread accessibility (T-A).

After the initialization, all nodes in a control flow graph (CFG) in the program are updated with respect to thread accessibility (T-A).

The first node of a main function is selected (operation 810), and it is determined whether memory access of the selected node occurs in a specific thread (operation 820). If memory access of the selected node does not occur, it is detected whether there is another node which has is not been inspected (operation 840), the detected node is selected (operation 850), and it is repeatedly determined whether memory access of the selected node occurs in the specific thread (operation 820).

If it is determined that the memory access occurs in operation 820, the thread accessibility (T-A) is updated (operation 830) as follows:

In the case in which a variable that determines the thread accessibility (T-A) is a global variable 'x,' if another node that is executed concurrently with a current node (or statement) and accesses the same variable (relevant information is present in the concur-relation), the current variable 'x' is updated as being available to perform thread access concurrently with another thread.

For example, (t',l') C-R (t,l) and (t',l',x)=tSingle or tMulti, the update is performed as [(t,l,x)→tMulti].

Otherwise, the update is made as [(t,l,x)→tSingle].

If the case in which a variable that determines the thread accessibility is a local variable 'x,' when the variable 'x' is allowed to be outside the current function through a global variable or a function parameter, the update is made as [(t,l, x)→tMulti].

Otherwise, the update is made as [(t,l,x)→tSingle].

With respect to the other thread access nodes (or statements), the update is made as [(t,l,x)→tMulti].

The above-described global variable refers to a variable available to be used in all regions, and generally, it is a variable that is declared outside a block. The global variable maintains its value until a program ends.

A local variable refers to a variable available to be used in a specific region. The variables declared in a block are all local variables, and can be used only in a limited region, the is block. In addition, the local variable loses its value when the block in which the variable is declared is finished.

The above procedures may be repeatedly performed until the thread accessibility of all nodes in the CFG of the program is not changed. This may include comparing previously analyzed thread accessibility and the currently analyzed thread accessibility (operation 860) to determine whether a change has occurred.

Figure 9:
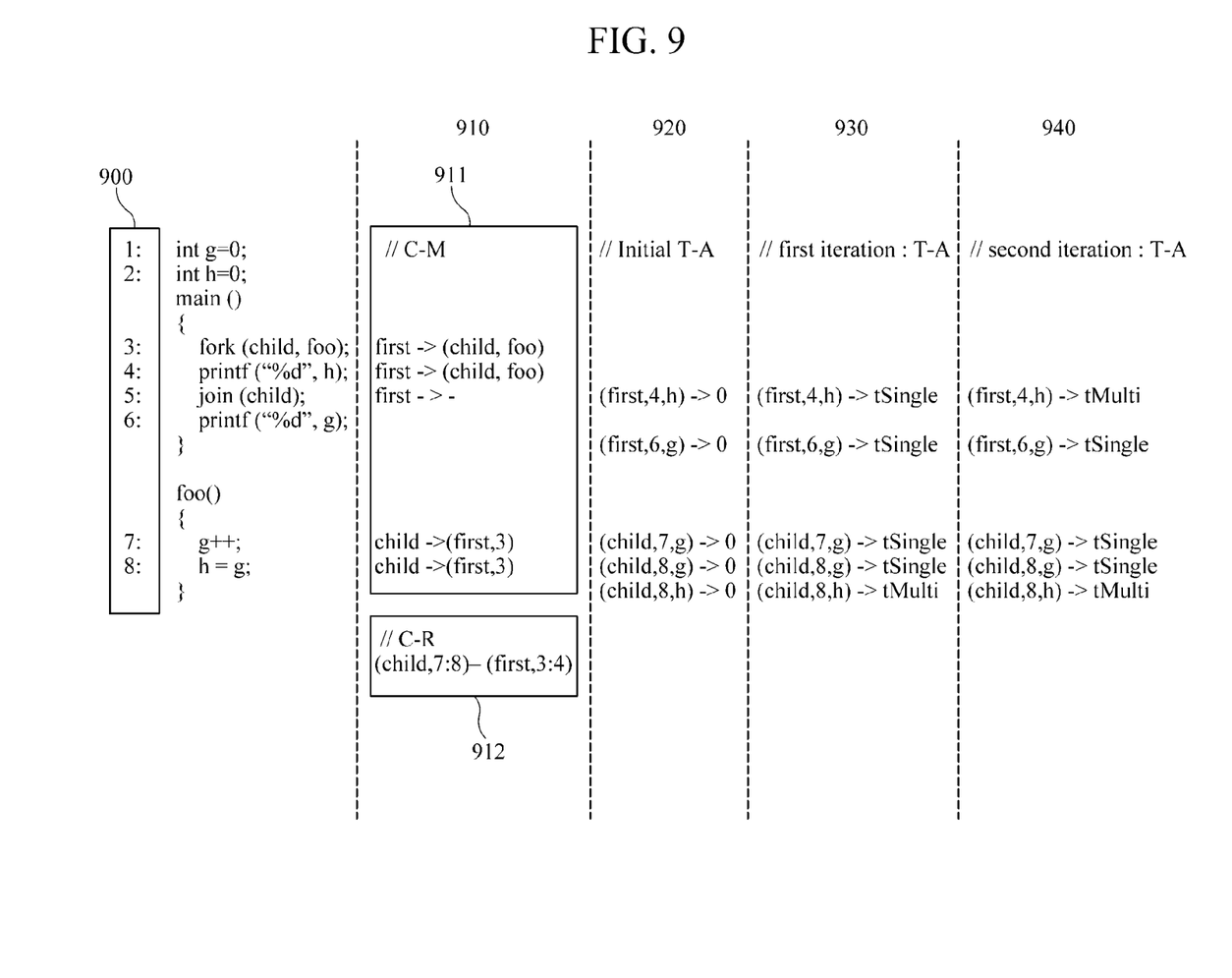
FIG. 9 is a diagram illustrating T-A represented according to a program code.

FIG. 9 illustrates thread accessibility represented according to a program code. In particular, FIG. 9 shows a result of computation of thread accessibility (T-A) via the procedures shown in FIG. 8 according to a program code.

A program code having line numbers is shown in the most left side, as denoted by reference 900. A concur-map (C-M) 911 is generated via the procedures as shown in FIGS. 3 and 4, and a concur-relation (C-R) 912 is deduced from the generated concur-map (operation 910).

To compute thread accessibility (T-A) based on the concur-map and the concur-relation (C-R), variables that perform thread access are initialized (operation 920). Reference 920 denotes a result from initialization of variables 'h' and 'g' to which perform thread access by applying the variables to (t,l,v)=0.

Then, the initial values are updated by applying thread accessibility (T-A) update rules described with reference to FIG. 8 according to the data control flow (operation 930).

Since the variable 'h' of a node 4 and the variable 'g' of a node 6 which are to be executed in the first thread perform thread access for the first time, they are updated to 'tSingle.' And since variables 'g' of a node 7 and a node 8 which are to be executed in a child thread perform thread access independently from the first thread, the variables 'g' are also updated to is 'tSingle.' However, since the variable 'h' of a node 8 to be executed in the child thread can be executed concurrently while the first thread is accessing the memory, the variable 'h' is updated to 'tMulti.'

The thread accessibility (T-A) which is updated as represented by operation 930 is updated again by applying the thread accessibility update rules described with reference to FIG. 8 according to the data control flow (operation 940). In operation 940, all variables are updated the same as in operation 930, except the variable 'h' of the node 4 to be executed in the first thread which is updated to 'tMulti.' This is because the child thread in the previous operation 930 is performing thread access and the first thread and the child thread are likely to execute the thread access concurrently if the thread access is re-performed. In addition, since no more updates will occur, final thread accessibility (T-A) is represented as denoted by operation 940.

Use of the final thread accessibility (T-A), program code optimization which, for example, reduces unnecessary lock may be realized. As illustrated in FIG. 9, only the variable 'h' of the node 4 and the variable 'g' of the node 8 are 'tMulti,' and hence only two cases are required to be analyzed.

In static or dynamic data-race verification, analysis performance may be enhanced by excluding the variables updated to 'tSingle' from the analysis and any unnecessary instrument(s) may be removed.

Figure 10:
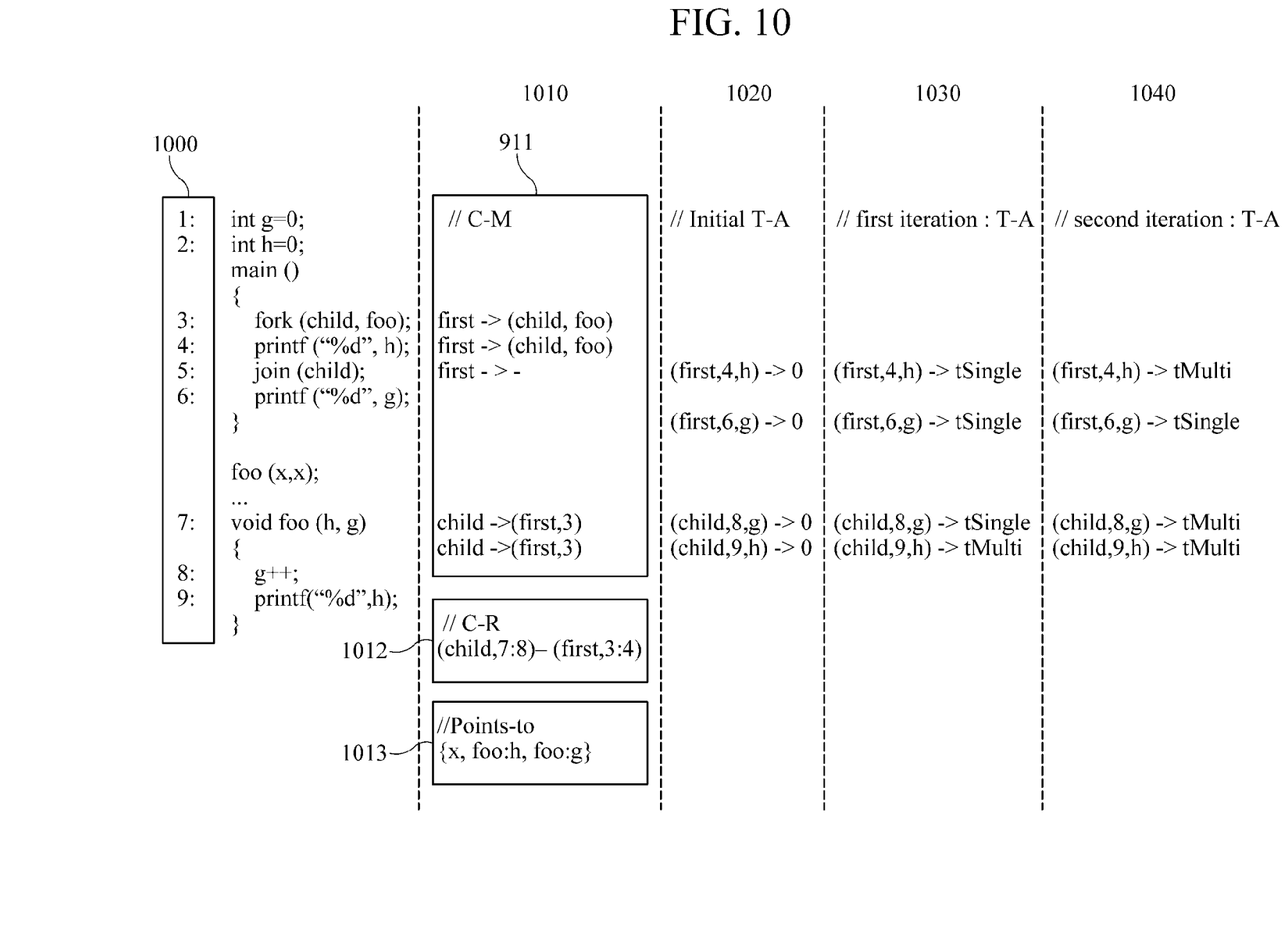
FIG. 10 is a diagram illustrating T-A computed by use of points-to information and according to a program code.

FIG. 10 illustrates thread accessibility (T-A) computed by use of points-to information and according to a program code.

In particular, FIG. 10 shows a result of computation of thread accessibility (T-A) via the procedures shown in FIG. 8 according to a program code. One difference from the example illustrated in FIG. 9 is the additional utilization of points-to information.

Points-to information contains information whether variables inside a program which are defined as different characters indicate the same memory region.

A program code having line numbers is shown in the most left side, as denoted by reference 1000. A concur-map (C-M) 1011 may be generated through procedures illustrated in FIGS. 3 and 4, and a concur-relation (C-R) 1012 may be generated from the concur-map (C-M) 1011. In addition, the points-to information is obtained from the operation of line numbers 7, 8, and 9 below, by a function 'foo (x,x)' of a program code. Since variables 'h' and 'g' to be called by a function 'foo ( )' are defined as the same function by 'x,' as denoted by reference 1013, the points-to information is represented as {x, foo:h, foo:g}. This means that a variable 'x' and variables 'h' and 'g' to be used in a function 'foo' can concurrently perform thread access (operation 1010).

In computation of thread accessibility (T-A) based on the above, variables that perform thread access are initialized (operation 1020). For example, variables 'h' and 'g' that perform thread access are initialized to 0 according to (t,l,v)=0.

Then, the initialization values are updated using the T-A proposed in FIG. 8 according to the data control flow (operation 1030).

A variable 'h' of a node 4 to be executed in the first thread and a variable 'g' of a node 6 are updated to 'tSingle' since they perform the first thread access, and a variable 'g' of a node 8 to be executed in a child thread can perform thread access independently from the first thread is updated as 'tSingle.' However, a variable 'h' of a node 9 to be executed in the child node may be executed concurrently while the first thread is accessing the memory, and thus the variable may be updated as 'tMulti.'

The thread accessibility (as shown by operation 1030) may be updated again by applying is the thread accessibility (T-A) described in FIG. 8 according to the data control flow (operation 1040). In this case, variables may be updated the same as those in operation 1030, except the variable 'h' of the node 4 to be executed in the first thread, which is updated to 'tMulti.' This is because the child thread in the previous operation 1030 is performing thread access and the first thread and the child thread are likely to execute the thread access concurrently if the thread access is re-performed. In addition, although a variable 'g' of the node 8 to be executed in the child thread performs thread access independently from the first thread, variables 'g' and 'h' to be executed in line numbers 8 and 9 are updated to 'tMulti' according to the points-to information. And when no more updates can occur, final thread accessibility is obtained as denoted by operation 1040.

According to embodiments, by providing information of single thread access to a compile time, the number of thread accesses to be instrumented can be reduced and the number of thread accesses to be analyzed in runtime can also be reduced. Moreover, by use of the signal thread accessibility analysis, runtime verification may be performed while reducing thread access to be verified. And, by reducing unnecessary locks, a program code size and code performance for verifying errors or performance of multi-threaded program can be increased.

In addition, in data-race analysis, the single thread accessibility analysis may contribute to elimination of unnecessary instrument, increase of analysis performance, and/or prevent memory overload.

One or more embodiments described herein may be implemented as computer readable codes (instructions) in a computer readable record medium, for instance, by a computer or computing device having one or more processors that read and execute said codes (instructions). Codes and code segments constituting the computer program can be easily inferred by a skilled computer programmer in the art. The computer readable record medium may include various is types of record media in which computer readable data are stored. Examples of the computer readable record medium may include, for instance: a ROM, a RAM, a CD, DVD, a magnetic tape, a floppy disk, or optical data storage devices. In addition, the computer codes and instructions may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of analyzing single thread access by a variable of a multi-threaded program in a computing system, the method comprising:
    computing a thread identifier of a thread to be executed in a node of the multi-thread program;
    computing multiple threads configured to concurrently execute the node; and
    computing thread accessibility by deducing a variable that is executed in a single thread of the program from a pair of the computed threads configured to concurrently execute the node, wherein
    when the variable present in the node is a local variable and the variable is allowed to be outside a region currently executed, determining thread accessibility of the variable as multiple thread access.

2. The method of claim 1, wherein the computing of the thread identifier comprises:
    generating a control flow graph graphically by transforming a control flow to an edge, and an assignment or a condition that changes a state of the program to a node.

3. The method of claim 1, wherein the computing of the threads comprises:
    generating a concur-map by mapping the thread identifiers of the threads, configured to concurrently execute the node of the program, to corresponding nodes, and
    generating a concur-relation indicating concurrent execution of the node by the thread by extracting the pair of the threads configured to concurrently execute the same node based on the concur-map.

4. The method of claim 3, wherein the generating of the concur-map comprises:
    when the node is a fork operation to generate a new process, computing a parent thread identifier of a parent thread that executes the node and a child thread identifier that is written in the node;
    computing another node configured to be concurrently executed with the node by obtaining information about a function to be executed by the child thread while the parent thread is executing the node; and
    generating the concur-map by mapping the computed thread identifier to the computed node.

5. The method of claim 3, wherein the generating of the concur-map comprises:
- when the node is a join operation to end a running process, computing a child thread identifier that is written in the node;
- computing information that indicates that the node is not concurrently executed with a child thread of the child thread identifier using the computed child thread identifier; and
- generating the concur-map by mapping the computed thread identifier and the computed information.

6. The method of claim 3, wherein the generating of the concur-map comprises:
- if the node is a node in which two edges are combined together, adding concur-maps generated from the respective edges.

7. The method of claim 3, wherein the generating of the concur-map comprises:
- when the node is not a fork operation to generate a new process, performing a join operation to end a running process; and
- when the node is not a node in which two edges are combined together, determining a concur-map which has been generated from a previous node as a concur-map for the node.

8. The method of one of claim 4, wherein the generating of the concur-map is repeatedly performed for all nodes of the program until a generated concur-map is not transformed.

9. The method of claim 3, wherein the generating of the concur-relation comprises:
- detecting a pair of the node and a thread identifier of a thread configured to perform concurrent execution using the generated concur-map;
- deducing a pair of a node and a thread identifier, which has transitivity, from the detected pair of the thread identifier and the node; and
- generating the concur-map by mapping the computed thread identifier and the node.

10. The method of claim 1, wherein the computing of the thread accessibility comprises:
- assigning an initial value to thread accessibility of a variable which performs thread access and is present in a node that is executed by a thread; and
- determining the thread accessibility of a variable as multiple thread access when the variable is present in the node executed by a specific thread and it is detected that the same variable is present in another node that is concurrently executed by the specific thread with reference to a pair of threads to concurrently execute the each node.

11. The method of claim 10, wherein the computing of the thread accessibility comprises:
- determining the thread accessibility of a variable as single thread access when the variable is present in the node executed by a specific thread; and
- detecting that the same variable is not present in another node that is concurrently executed by the specific thread with reference to a pair of threads to concurrently execute the node.

12. The method of claim 10, wherein the computing of the thread accessibility further comprises:
- when the variable present in the node is a local variable and the variable is allowed to be outside a region currently executed, determining thread accessibility of the variable as multiple thread access; and
- when the variable is not allowed to be outside a region currently executed, determining thread accessibility of the variable as single thread access.

13. The method of claim 1, wherein the computing of the thread accessibility comprises:
- determining whether two variables present in the node access the same memory space and generating points-to information of the two variables that access the same memory space, and
- determining thread accessibility of the variable present in the node as multi thread access when it is determined, with reference to the pair of threads configured to concurrently execute the computed node and the points-to information, that another variable which is belonging to the same points-to group as the variable and performs thread access is present in another node configured to be executed concurrently with the node by a specific thread.

14. The method of claim 13, wherein the computing of the thread accessibility further comprises:
- determining thread accessibility of the variable present in the node as single thread access when it is determined, with reference to the pair of threads configured to concurrently execute the computed node and the points-to information, that another variable which is belonging to the same points-to group as the variable and performs thread access is not present in another node configured to be executed concurrently with the node by a specific thread.

15. The method of claim 13, wherein the computing of the thread accessibility further comprises:
- when the variable is not allowed to be outside a region currently executed, determining thread accessibility of the variable and another variable configured to access the same memory space as single thread access, and determining thread accessibility of the other variable as single thread access when the other variable is not allowed to be outside a region currently being executed.

16. A non-transitory computer-readable medium having instructions that when executed are configured to implement a method of analyzing single thread access by a variable of a multi-threaded program in a computing system, the instructions configured to:
- compute a thread identifier of a thread to be executed in a node of the multi-thread program;
- compute multiple threads configured to concurrently execute the node; and
- compute thread accessibility by deducing a variable that is executed in a single thread of the program from a pair of the computed threads that concurrently execute the node, wherein
- when the variable present in the node is a local variable and the variable is allowed to be outside a region currently executed, determining thread accessibility of the variable as multiple thread access.

17. A computing device having one or more processors configured to implement a method of analyzing single thread access by a variable of a multi-threaded program in a computing system, the one or more processors configured to:
- compute a thread identifier of a thread to be executed in a node of the multi-thread program;
- compute multiple threads configured to concurrently execute the node; and
- compute thread accessibility by deducing a variable that is executed in a single thread of the program from a pair of the computed threads that concurrently execute the node, wherein when the variable present in the node is a local variable and the variable is allowed to be outside a region currently executed, determining thread accessibility of the variable as multiple thread access.

* * * * *